(12) United States Patent
Sumiya et al.

(10) Patent No.: US 7,568,654 B2
(45) Date of Patent: Aug. 4, 2009

(54) REEL

(75) Inventors: Yosuke Sumiya, Kanagawa (JP); Teruo Ashikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 152 days.

(21) Appl. No.: 11/797,276

(22) Filed: May 2, 2007

(65) Prior Publication Data
US 2007/0257149 A1 Nov. 8, 2007

(30) Foreign Application Priority Data
May 8, 2006 (JP) .............................. 2006-129656

(51) Int. Cl.
*B65H 75/18* (2006.01)
(52) U.S. Cl. .................. 242/608.8; 242/348; 242/609.4
(58) Field of Classification Search ................ 242/348, 242/348.2, 608.8, 614, 609.4, 338, 338.1; 360/132
See application file for complete search history.

(56) References Cited
U.S. PATENT DOCUMENTS 5,318,239 A * 6/1994 Posso ...................... 242/608.8
6,349,015 B1 * 2/2002 Hayashi ...................... 360/132
6,857,591 B2 * 2/2005 Hiraguchi et al. ........... 242/348
7,032,855 B2 * 4/2006 Shiga .......................... 242/614
7,168,655 B2 * 1/2007 Morita ........................ 242/348
7,354,016 B2 * 4/2008 Hiraguchi ................... 242/348
2004/0099762 A1 * 5/2004 Shiga .......................... 242/614
2005/0236512 A1 * 10/2005 Hiraguchi ................ 242/608.8

FOREIGN PATENT DOCUMENTS

JP      2001-135063 A   5/2001
JP      2005-251272 A   9/2005

* cited by examiner

*Primary Examiner*—William A Rivera
(74) *Attorney, Agent, or Firm*—Sughrue Mion, PLLC

(57) ABSTRACT

A reel is provided including a cylindrical hub onto which a recording tape is wound; an upper flange that is integrally provided at the hub, and that extends from one end portion of the hub; and a lower flange that includes a bottom wall to which a reel plate is fixed, and that is welded to the other end portion of the hub, in order that deformations and surface runout of the flanges can be suppressed without increasing number of process and/or manufacturing costs.

9 Claims, 11 Drawing Sheets

REEL

CROSS-REFERENCE TO RELATED APPLICATION

This application claims priority under 35 USC 119 from Japanese Patent Application No. 2006-129656, the disclosure of which is incorporated by reference herein.

BACKGROUND OF THE INVENTION

1. Field of the Invention

The present invention relates to a reel around which a recording tape such as a magnetic tape used as a recording/playback medium for mainly computers and the like.

2. Description of the Related Art

Conventionally, a recording tape such as a magnetic tape is wound around a reel made from synthetic resin, and the tape is used as a data recording/playback medium (data backup) for devices such as computers. This is known as a recording tape cartridge where the reel is housed singly inside a case. The reel of this recording tape cartridge is formed from, e.g., a lower flange and hub integrally formed, and an annularly-shaped upper flange adhered to the upper peripheral edge of the hub. (See, for example, Japanese Patent Application Laid-Open (JP-A) No. 2001-135063.)

In a reel of this type of configuration, in a metal mold used to integrally form the lower flange and hub, a gate for injecting resin material is positioned so as to correspond to a position of the bottom wall portion of the hub. Accordingly, the resin material injected through the gate flows once into the "hub side" of the metal mold, and after that, flows to the "lower flange side" of the metal mold. This is because the hub is thicker than the lower flange. However, in a case of this type of flow of resin material, there is a problem in that shrinkage and the like occur because the cooling times of the hub and lower flange differ, and the lower flange deforms. This causes surface runout in the lower flange to increase. Further, if the hub deforms due to tight winding of the recording tape, there is a danger of the upper flange adhered to the hub also deforming.

Other reels are known, such as one where a hub having a bottom wall and an upper flange are integrally formed. The reel is formed by adhering an annularly-shaped lower flange to the peripheral edge of the bottom wall of the hub. (See, for example, Japanese Patent Application Laid-Open (JP-A) No. 2005-251272.) In this case, increase in surface runout in the upper flange can be suppressed, however, there is a problem in that, after adhering the lower flange to the hub, a reel plate made out of metal is fixed to the bottom wall of the hub. Accordingly, number of processes and manufacturing costs increase.

Here, in light of the above-described circumstances, the present invention provides a reel with which deformation of the flange and surface runout of the flange can be suppressed, without increasing number of processes and manufacturing costs.

SUMMARY OF THE INVENTION

A reel of a first aspect according to the present invention includes: a cylindrical hub onto which a recording tape is wound; an upper flange that is integrally provided at the hub, and that extends from one end portion of the hub; and a lower flange that includes a bottom wall to which a reel plate is fixed, and that is welded to the other end portion of the hub.

According to the present invention of the first aspect, the lower flange has a bottom wall so when forming the lower flange, a reel plate can be fixed thereto with insert molding. That is, the lower flange to which the reel plate is fixed can be welded to the hub integrally formed with the upper flange. Accordingly, there are no drawbacks such as increases in number of processes and manufacturing costs. Further, the hub is integrally formed with the upper flange and the bottom wall is formed at the lower flange so deformations and surface runouts in the upper and lower flanges can be contained.

The reel of a second aspect is the reel of the first aspect, wherein an engage portion is formed at the lower flange, and a portion that is engaged with the engage portion is formed at the other end portion of the hub.

According to the present invention of the second aspect, positioning of the hub relative to the reel gear formed annularly at the outer side of the reel plate can be performed by engaging the engage portion and the portion that is engaged with the engage portion to be engaged. Due to this, the degree to which the reel gear and the hub are coaxial can be increased.

Further, the reel of a third aspect is the reel of the first or second aspects, wherein the hub and the upper flange are integrally formed from a resin material with a metal mold, and a gate mark that corresponds to an injection port of the metal mold for injecting the resin material is formed at the other end portion of the hub.

According to the present invention of the third aspect, the resin material flows without reverse flow from the hub side in the metal mold to the upper flange side in the metal mold, so pressure is distributed evenly from the hub to the upper flange. Accordingly, pressure loss during formation can decreased and surface runout of the upper flange can be decreased.

Also, the reel of a fourth aspect is any one of the reels of the first through third aspects, wherein a plurality of depressions are formed in the lower flange.

According to the present invention of the fourth aspect, air between the recording tape when winding the recording tape to the hub can be expelled through these depressions. Accordingly, the winding form of the recording tape can be made neat.

Also, the reel of a fifth aspect is the reel of the first aspect, wherein the hub and the upper flange are integrally formed from a resin material with a metal mold, and an injection port for injecting the resin material is provided at the metal mold at a position corresponding to the other end portion of the hub.

Also, the reel of a sixth aspect is the reel of the fourth aspect, wherein the plurality of depressions are formed with substantially constant intervals therebetween at an upper surface of the lower flange.

Also, the reel of a seventh aspect is the reel of the second aspect, wherein the engage portion is formed at an upper surface of the lower flange as a convex portion, and the portion that is engaged with the engage portion is formed at the other end portion of the hub as a concave portion.

Also, the reel of an eighth aspect is the reel of the first aspect, wherein the reel plate is fixed to the bottom plate by insert molding.

Moreover, a reel of a ninth aspect is a reel including: a cylindrical hub onto which a recording tape is wound; an upper flange that is integrally provided at the hub, and that extends from one end portion of the hub; and a lower flange that includes a bottom wall to which a reel plate is fixed, and that is welded to the other end portion of the hub, wherein the hub and the upper flange are integrally formed from a resin material with a metal mold, and a gate mark that corresponds to an injection port of the metal mold for injecting the resin material is formed at the other end portion of the hub.

As explained above, with the present invention, a reel can be provided where surface runouts and deformations of flanges can be suppressed, without increasing number of processes and manufacturing costs.

BRIEF DESCRIPTION OF THE DRAWINGS

An exemplary embodiment of the present invention will be described in detail with reference to the following figures, wherein.

DETAILED DESCRIPTION OF THE INVENTION

Figure 1A:
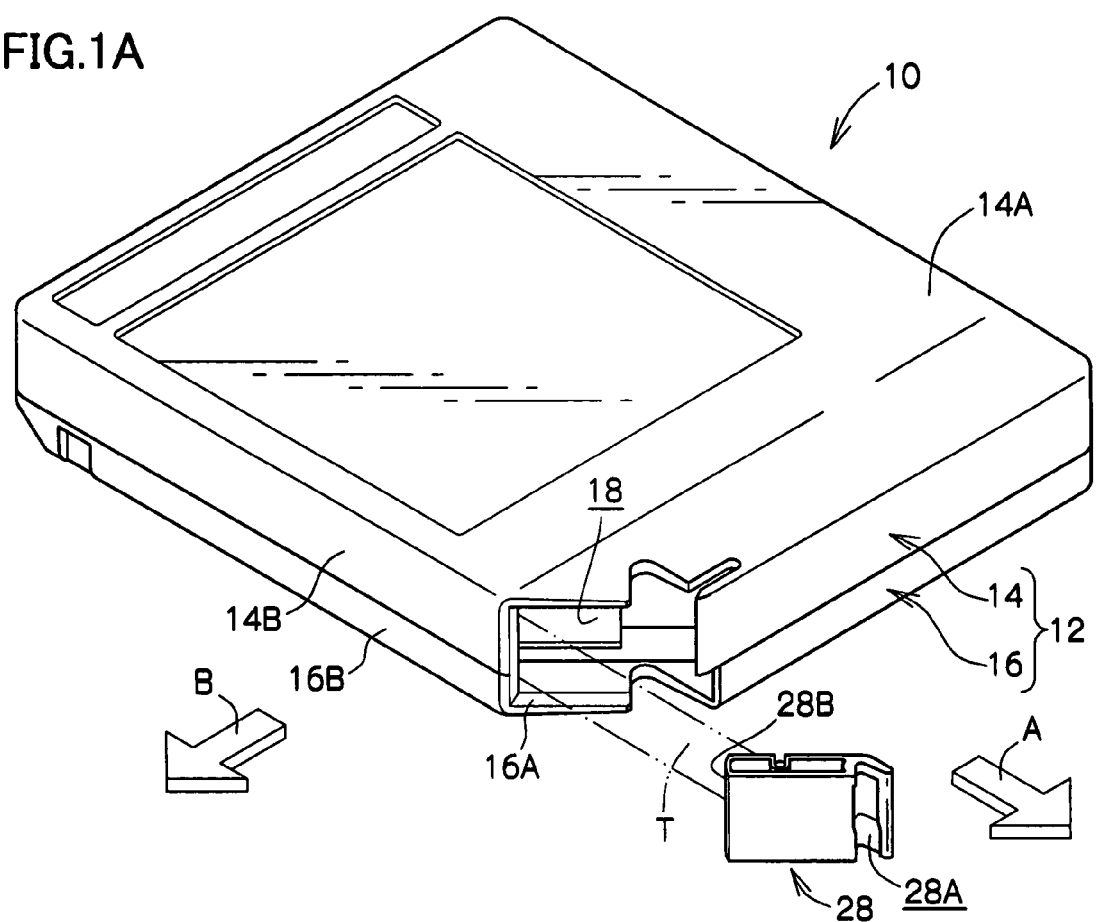
FIG. 1A is an overall perspective drawing where a recording tape cartridge is viewed from above.

Hereafter, the preferred embodiment for practicing the present invention will be explained in detail based on the exemplary embodiment shown in the drawings. Firstly, the overall configuration of a recording tape cartridge 10 will be explained. Note that for the sake of simplifying the explanations, the direction in which the recording tape cartridge 10 is loaded into a drive device is shown with an arrow marked "A", and this indicates the forward direction (i.e., front side) of the recording tape cartridge 10. Also, the direction that intersects perpendicularly with the direction of the A arrow is shown with an arrow marked "B", and this indicates the right direction (i.e., right side) of the recording tape cartridge 10.

As shown in FIGS. 1A, 1B, 2, 3, the recording tape cartridge 10 is provided with a case 12. The case 12 is structured by an upper case 14 and a bottom case 16 that are joined together. More specifically, the upper case 14 is formed from a substantially frame-shaped peripheral wall 14B that is provided to stand along the outer edge of a substantially rectangular top panel 14A (when viewed from top). The bottom case 16 is formed from a substantially frame-shaped peripheral wall 16B that is provided to stand along the outer edge of a bottom panel 16A formed to correspond approximately with the top panel 14A. The case 12 has the upper case 14 and bottom case 16 joined by ultrasonic adhesion, fastened with screws or the like, in a state where the opening end of the peripheral wall 14B and the opening end of the peripheral wall 16B hit against each other. The case 12 is formed into a substantially rectangular box shape.

An opening 18 that is slanted relative to the loading direction is formed in this case 12 by cutting away parts of each of the top panel 14A, peripheral wall 14B, bottom panel 16A, and peripheral wall 16B, in the corner portion of the case 12 at the leading-end side in the direction in which the case 12 is loaded into the drive device. Also, a circular gear opening 20 that passes through the bottom panel 16A is formed approximately in the central portion of the bottom panel 16A, and is used to expose a reel gear 44, which will be described later. An annular rib 22 is provided at the edge portion of the gear opening 20 in the bottom panel 16A so as to protrude towards the inner side of the case 12. The annular rib 22 is used to position a reel 30, which will be described later, and for dustproof.

Also, a pair of positioning holes 24, 26 open in the front end vicinity of the outer surface of the bottom panel 16A of the case 12. The pair of positioning holes 24, 26 are provided so as to have bag-like shape in protrusions (not shown) set to stand from the bottom panel 16A towards the inner side of the case 12. These are arranged apart from each other on a hypothetical line in the direction of the B arrow. The positioning hole 24 that is at the side close to the opening 18 is formed in a substantially square shape when viewed from bottom and it circumscribes a positioning pin (not shown) of the drive device. The positioning hole 26 is a longitudinal hole that is long along the direction of the above-described hypothetical line and its width corresponds to the diameter of a positioning pin. Accordingly, this is configured so when the recording tape cartridge 10 is loaded into the drive device and the positioning pins are inserted into each of the positioning holes 24, 26, the cartridge is properly positioned inside the drive device in the horizontal directions (i.e., left and right and front and back directions).

Further, around the positioning holes 24, 26 on the bottom panel 16A, reference surfaces 24A, 26A are made to be smoother than other portions (a design surface). The base surfaces 24A, 26A are made to come into contact with reference surfaces (not shown in drawings) of the drive device provided around the positioning pins when the positioning pins are inserted into the positioning holes 24, 26. Due to this, this is configured so that the recording tape cartridge 10 is positioned in the vertical direction inside the drive device.

Figure 1B:
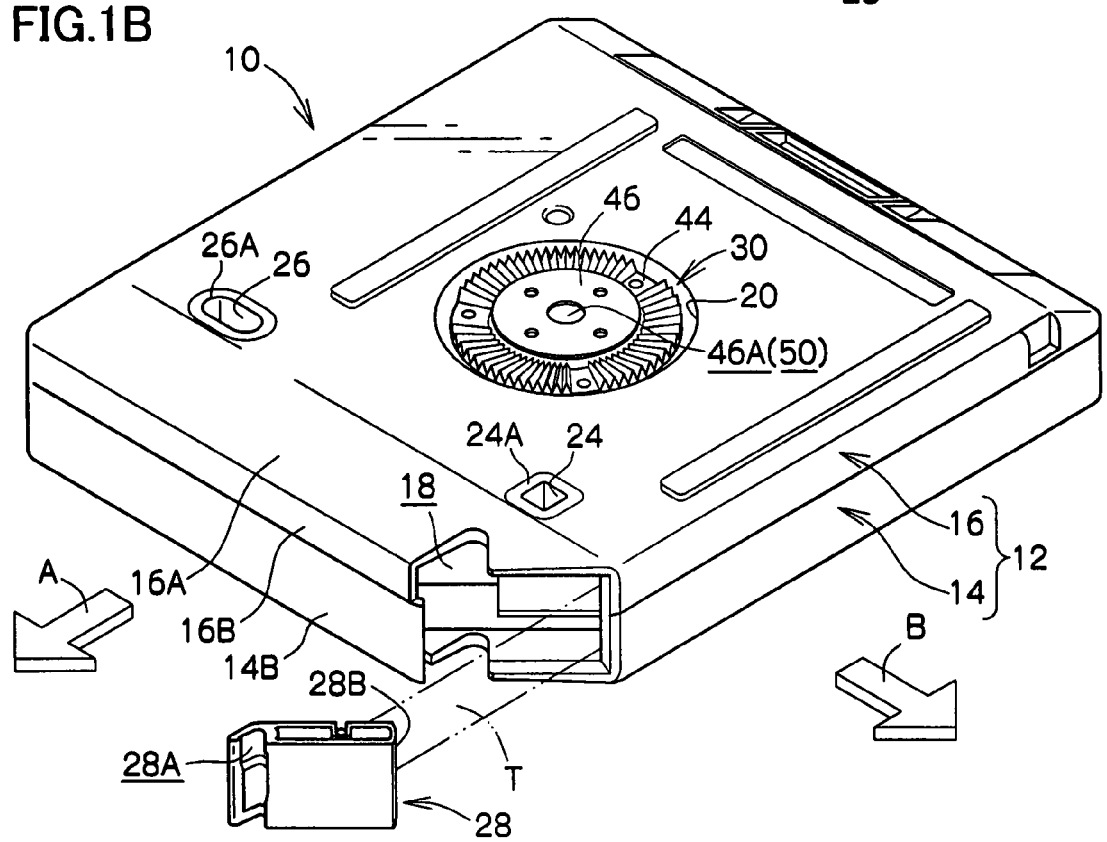
FIG. 1B is an overall perspective drawing where the recording tape cartridge is viewed from below.
Figure 2:
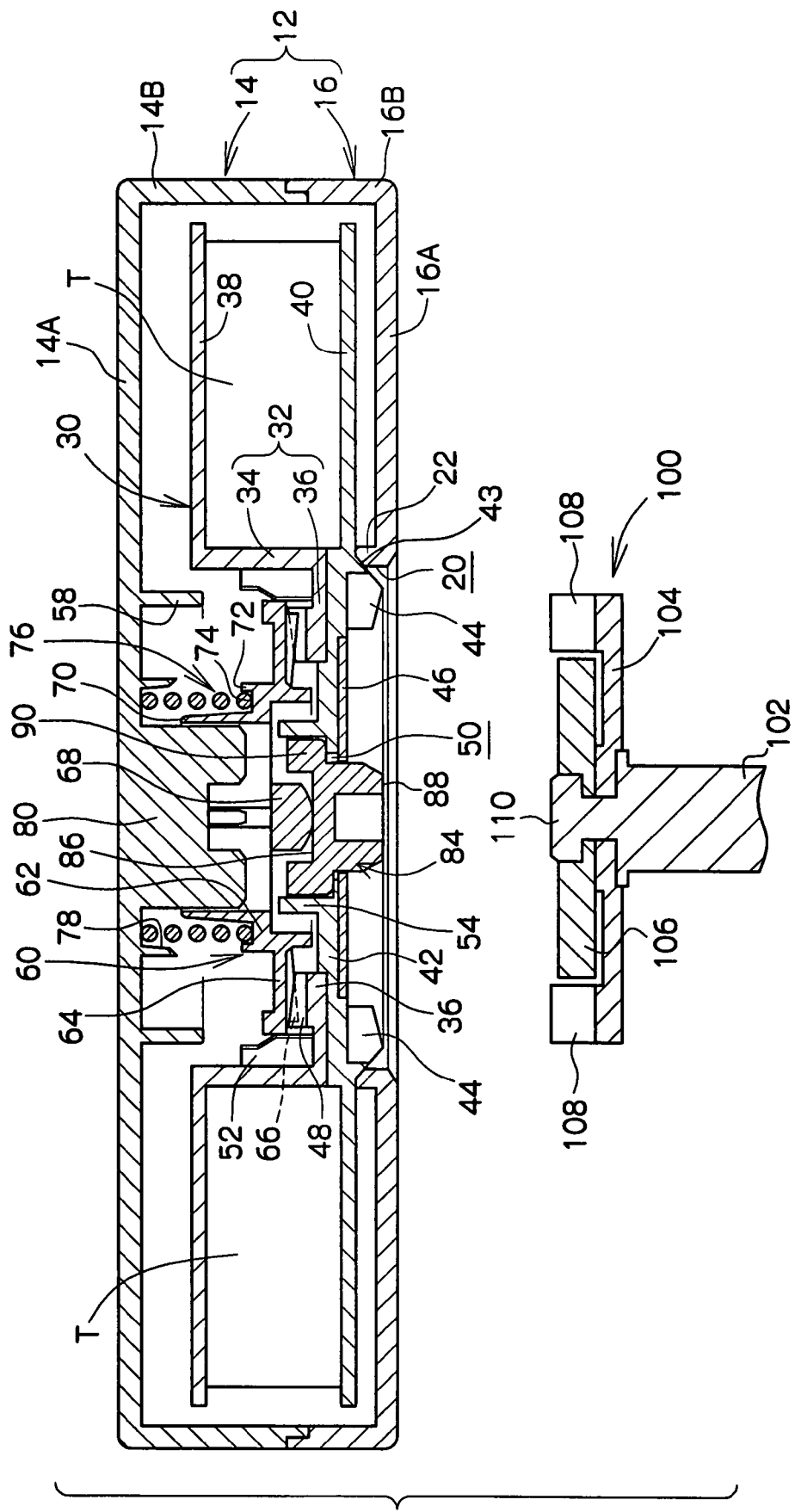
FIG. 2 is a cross-sectional drawing of when the reel of the recording tape cartridge is in a rotation-lock position.
Figure 3:
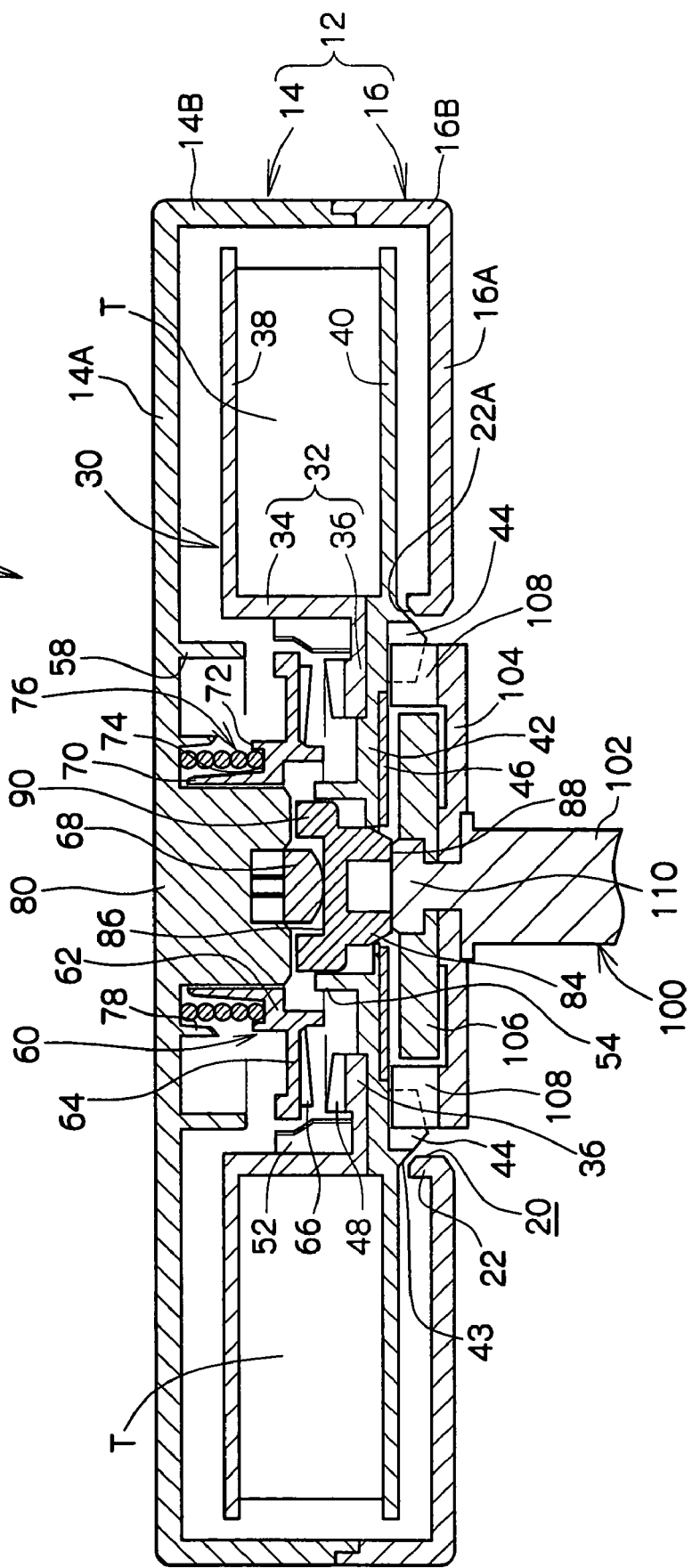
FIG. 3 is a cross-sectional drawing of when the reel of the recording tape cartridge is in a position where rotation is allowed.
Figure 4:
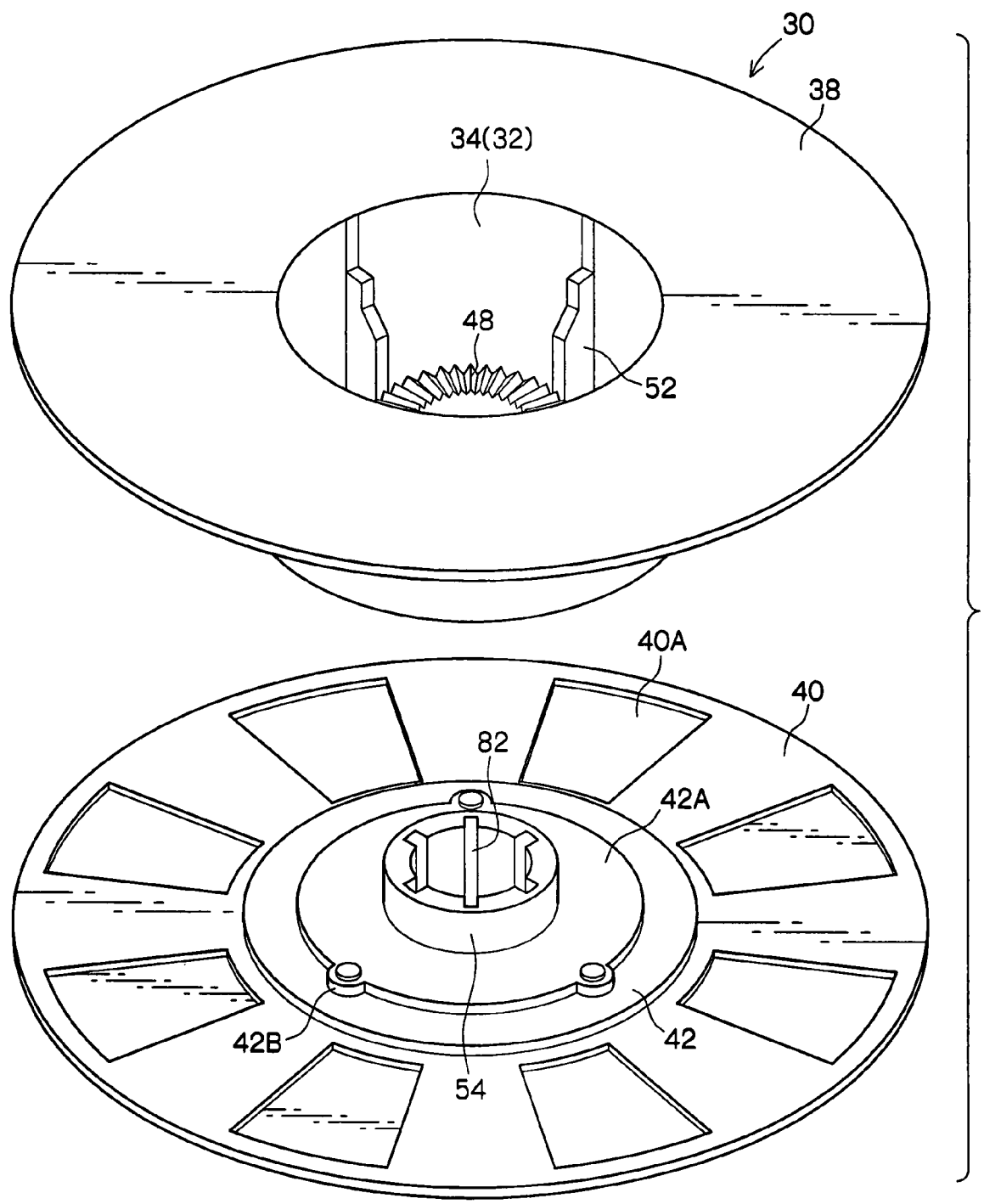
FIG. 4 is an exploded perspective drawing where the reel is viewed from above.
Figure 5:
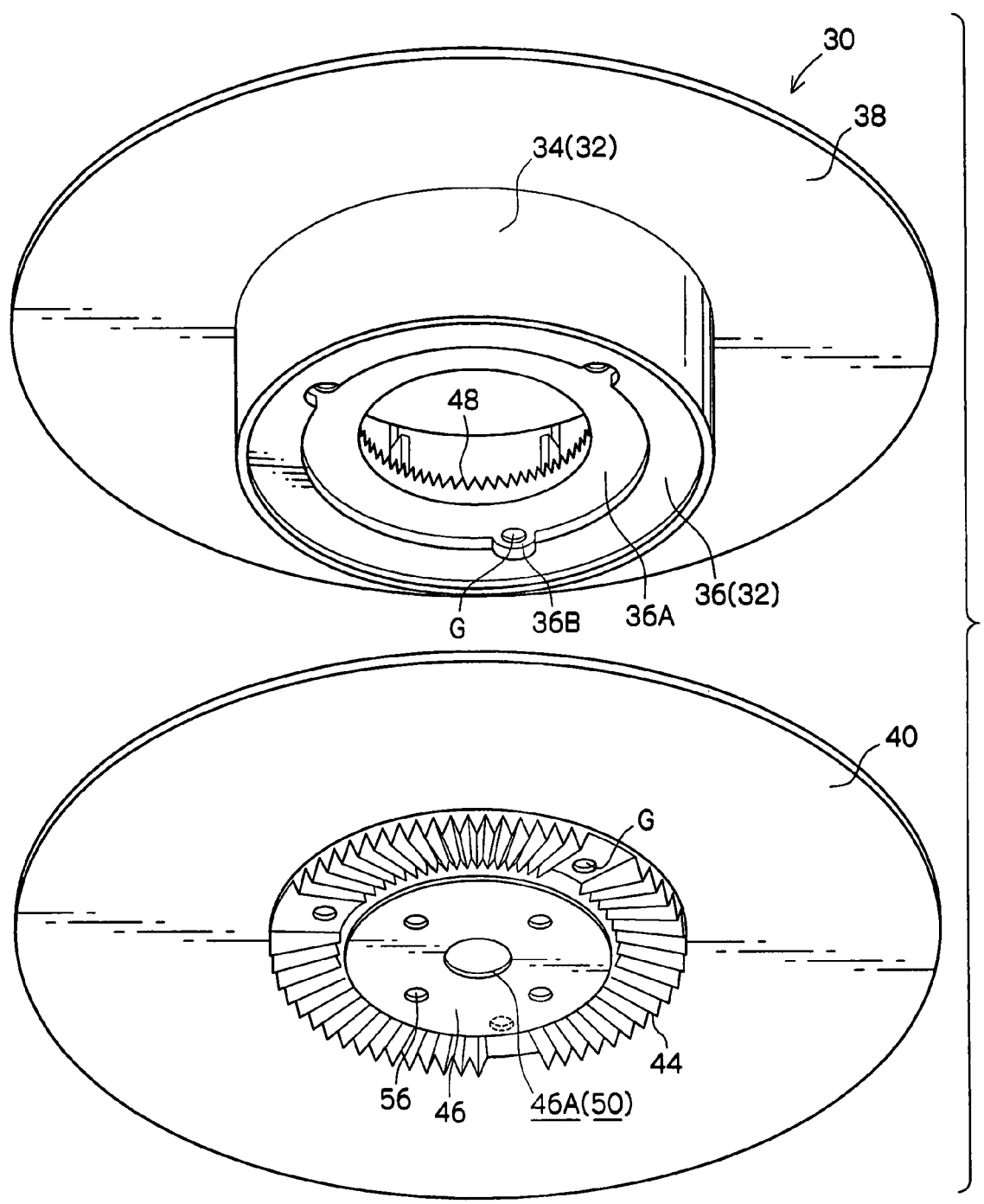
FIG. 5 is an exploded perspective drawing where the reel is viewed from below.

Also, as shown in FIGS. 2 and 3, only one reel 30 (which will be described later) is rotatably housed inside the case 12. A recording tape T such as magnetic tape is wound around this reel 30 and, as shown in FIG. 1, a leader block 28 is attached to the leading end of the recording tape T as a leader component. The leader block 28 is housed and retained at the inner side of the opening 18 of the case 12 when the recording tape cartridge 10 is not in use. Then, in this state, the leader block 28 seals the opening 18 and blocks the entering of dust and the like into the interior of the case 12.

Also, a hooking depression (a concave portion) 28A is formed at the leading end of the leader block 28. This is made so that when pulling the recording tape T out at the interior of the drive device, the tape is extracted from the case 12 with a pullout means (not shown) that engages with the hooking depression 28A, and then guided to a windup reel (not shown) of the drive device. Further, the leader block 28 has an arced surface 28B, at the end surface at the side opposite the hooking depression 28A, which forms a portion of a surface that winds up the recording tape T by fitting into the reel hub of the windup reel.

Next, the reel 30 and a braking member that prevents rotation of the reel 30 when the reel 30 is not in use will be explained. As shown in FIGS. 4-7 and 10 and 11, the reel 30 is provided with a reel hub 32 that forms the central axis portion of the reel 30. The reel hub 32 has a cylinder 34 around whose external peripheral surface the recording tape T is wound, and an annular extension 36 provided integrally at the lower end portion of the cylinder 34 to extend annularly at a preset width towards the center of the reel hub 32. Note that the width W of this annular extension 36 (see FIG. 7) is made to be such that an engage gear 48 and standing ribs 52, which will be described later, can be formed.

An annular depression (annular concave portion) 36A of a preset depth is formed at the undersurface of the annular extension 36 at the central side of the reel hub 32 as a portion that is engaged with. Note that plural expanded depressions (expanded concave portions) 36B (in the drawings, three) are formed at preset intervals therebetween in the annular depression 36A, and their areas in the diameter direction open and expand in arc shapes. Gates G are formed in the expanded depressions 36B. Note that the "gate G" is a mark which is formed by a gate (an injection port) of a metal mold through which the resin material is filled. Also, an upper flange 38 is provided to extend towards the outer side in the direction of diameter coaxially and integrally with the peripheral edge of the upper end portion of the reel hub 32. That is, the reel hub 32 and the upper flange 38 are made to be integrally formed from a resin material.

Figure 8:
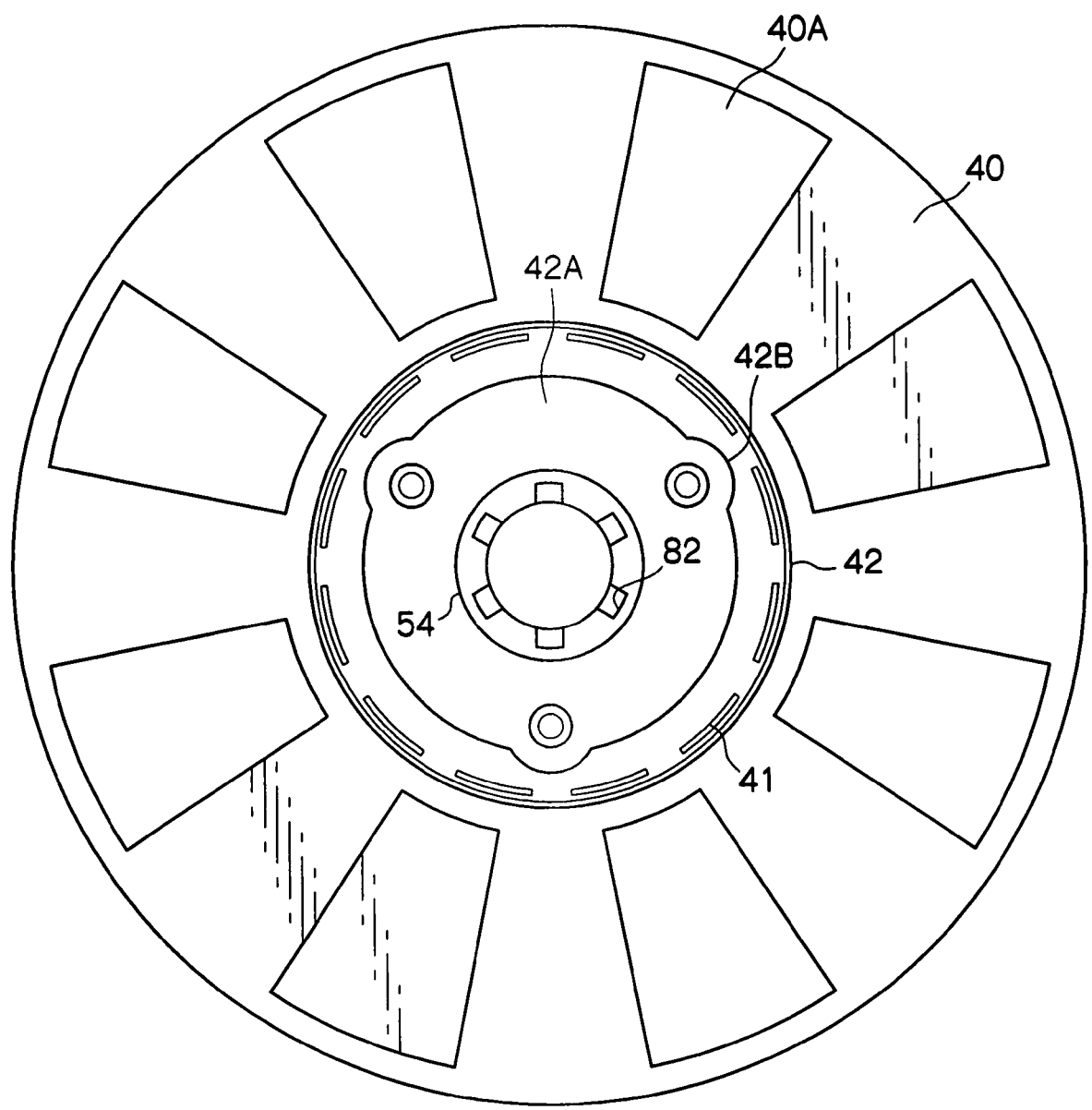
FIG. 8 is a flat drawing of the lower flange.

A lower flange 40 to which a reel plate 46 is fixed (to be described later) is made to be joined (i.e., adhered) to the bottom end portion of the reel hub 32. As shown in FIGS. 4, 5, and 8-11, the outer diameter of the lower flange 40 is made to be the same as that of the upper flange 38, and a bottom wall 42 having substantially the same diameter as that of the reel hub 32 is formed in the axial center portion. An annular stage (annular convex portion) 42A that acts as an engage portion that engages with the annular depression 36A is formed at a preset height on the upper surface of the bottom wall 42. Plural expanded protrusions (expanded convex portions) 42B (in the drawing, three) that fit into the expanded depressions 36B are formed at preset intervals therebetween on the annular stage 42A. Also, as shown in FIGS. 8 and 10, multiple (in the drawing, twelve) energy directors (hereafter, "ED") 41 that are ribs for adhesion are provided at equal intervals so as to protrude at the upper surface of the bottom wall 42.

Accordingly, when adhering the lower flange 40 to the undersurface of the annular extension 36 of the reel hub 32, the expanded protrusions 42B are made to fit into the expanded depressions 36B and the annular stage 42A is made to fit into the annular depression 36A, and fused with the ED 41 using ultrasonic waves generated from a horn (not shown). Due to this, the lower flange 40 (or rather, the reel gear 44 that will be described later) can be positioned to the reel hub 32 while adhering the undersurface of the annular extension 36 with the upper surface of the bottom wall 42, and the recording tape T can be wound around the outer peripheral surface of the cylinder 34 of the reel hub 32 in the space between the surfaces of the upper flange 38 and lower flange 40, which face each other. Note that multiple depressions (concave portions) 40A (in the drawing, eight) are formed on the upper surface of the lower flange 40 at equal intervals therebetween and at a preset depth in shapes substantially like isosceles (equal leg) trapezoids. When winding the recording tape T up onto the cylinder 34 of the reel hub 32, the air between the recording tape T can be expelled through the depressions 40A.

Figure 9:
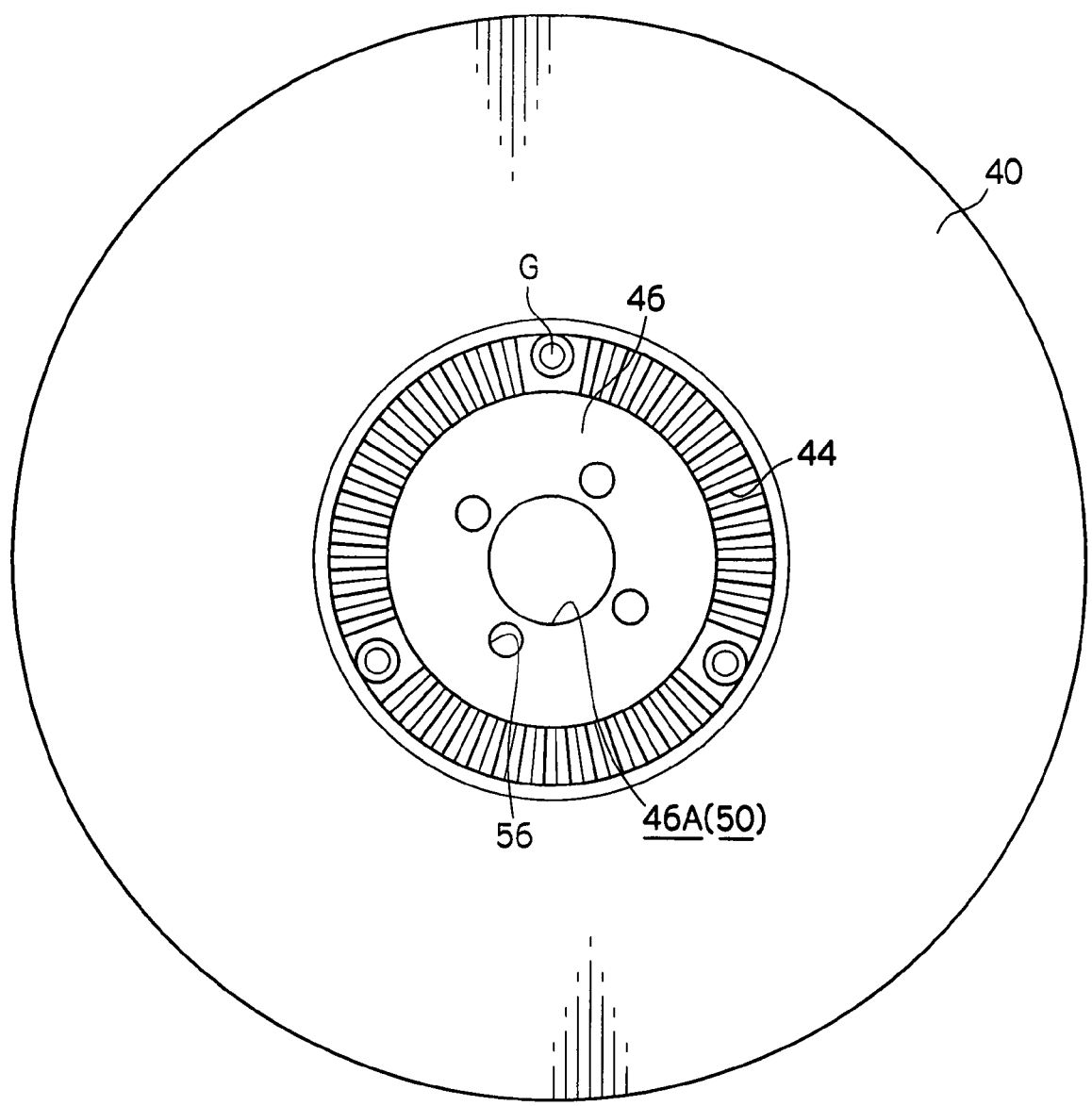
FIG. 9 is a bottom-surface drawing of the lower flange.
Figure 10:
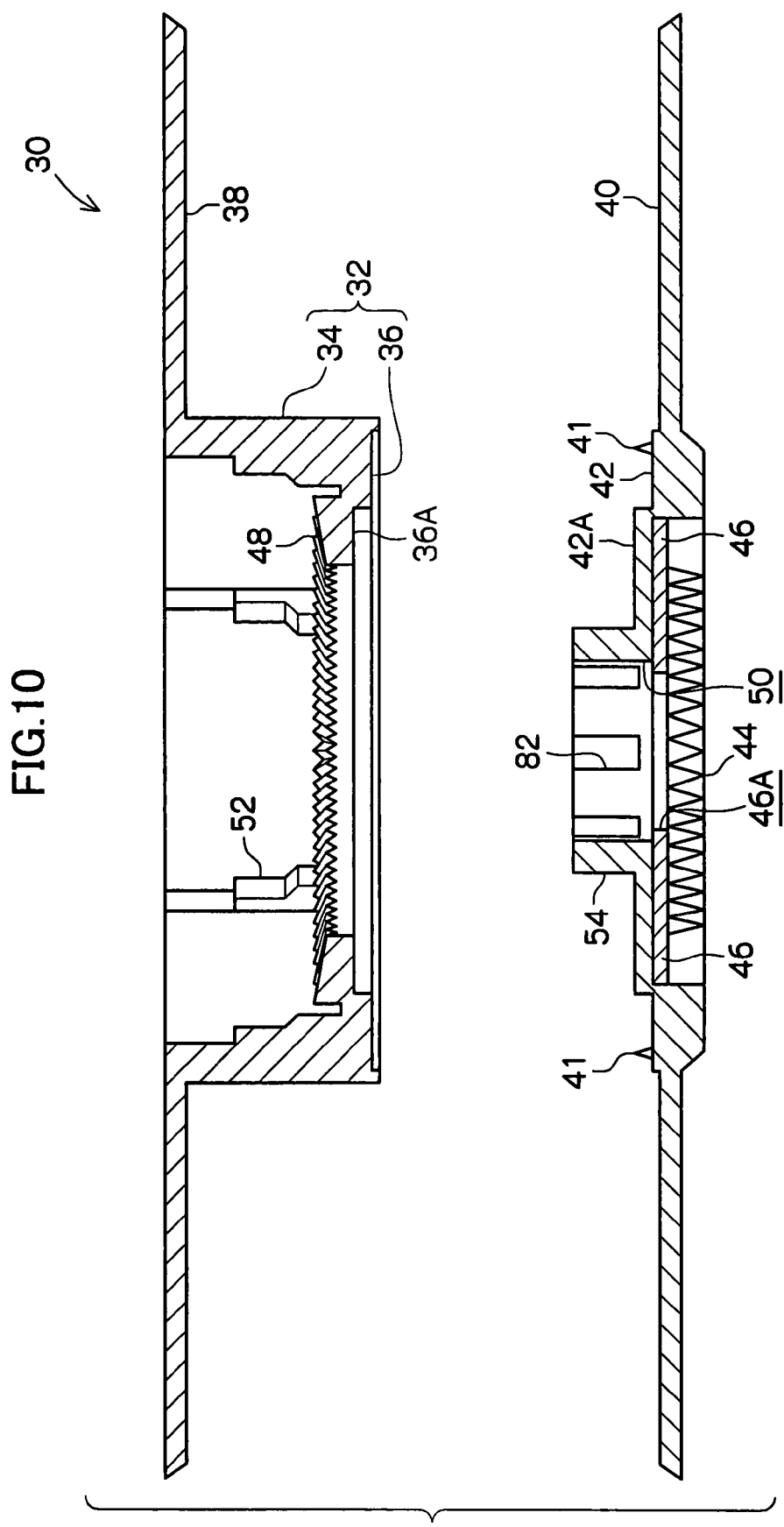
FIG. 10 is an exploded cross-sectional drawing of the reel.

Also, as shown in FIG. 9, the annular reel gear 44 is formed coaxially with the reel hub 32 at the undersurface (i.e., outer surface) of the bottom wall 42 in the lower flange 40 when joined with the reel hub 32. The reel gear 44 is made to be able to mesh with a drive gear 108 provided on the leading end of a rotation shaft 100 of the drive device, as shown in FIGS. 2 and 3. The teeth tips of this reel gear 44 protrude out downward further than the undersurface of the lower flange 40 and the bottoms of the teeth are positioned further to the upper side than the undersurface of the lower flange 40. The outer end portion in the diameter direction of each tooth, from the central portion in the direction of tooth height to the bottom of the tooth, is linked with a tapered portion 43 which is formed continuously to the lower flange 40. Also, plural gates G (in the drawing, three) are formed as injection ports for the resin material at preset positions on the reel gear 44. Note that the "gate G" is a mark which is formed by a gate (an injection port) of a metal mold through which the resin material is filled.

Figure 11:
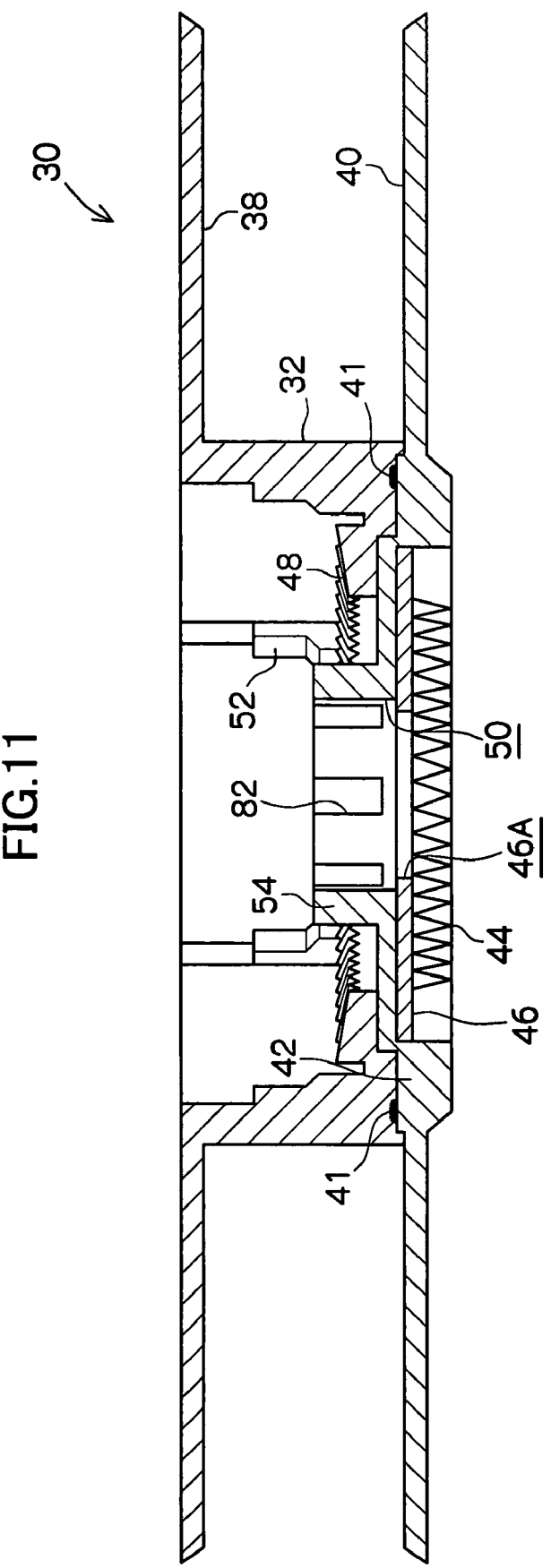
FIG. 11 is a cross-sectional drawing of the reel.

Further, the reel plate 46, which is an annular metal plate made from a magnetic material, is coaxially and integrally fixed to the bottom wall 42 of the lower flange 40 by insert form at the inner side of the reel gear 44. Accordingly, plural small holes 56 (in the drawing, four) are formed in the reel plate 46 and these are provided with step portions for the resin material to surround and fix to. Also, a through-hole 50 through which a clutch component 84, which will be described later, is inserted is formed in the center (central axis portion) of the bottom wall 42 in the lower flange 40. A short circular clutch boss 54 that acts as a guide wall portion is provided along the edge of the through-hole 50 to stand upward. This clutch boss 54 will be explained later along with the clutch component 84. Note that the axial center of the reel plate 46 is through-hole 46A and, as shown in FIGS. 10 and 11, the inner diameter of the through-hole 46A is formed to be slightly smaller than the inner diameter of the through-hole 50.

Figure 6:
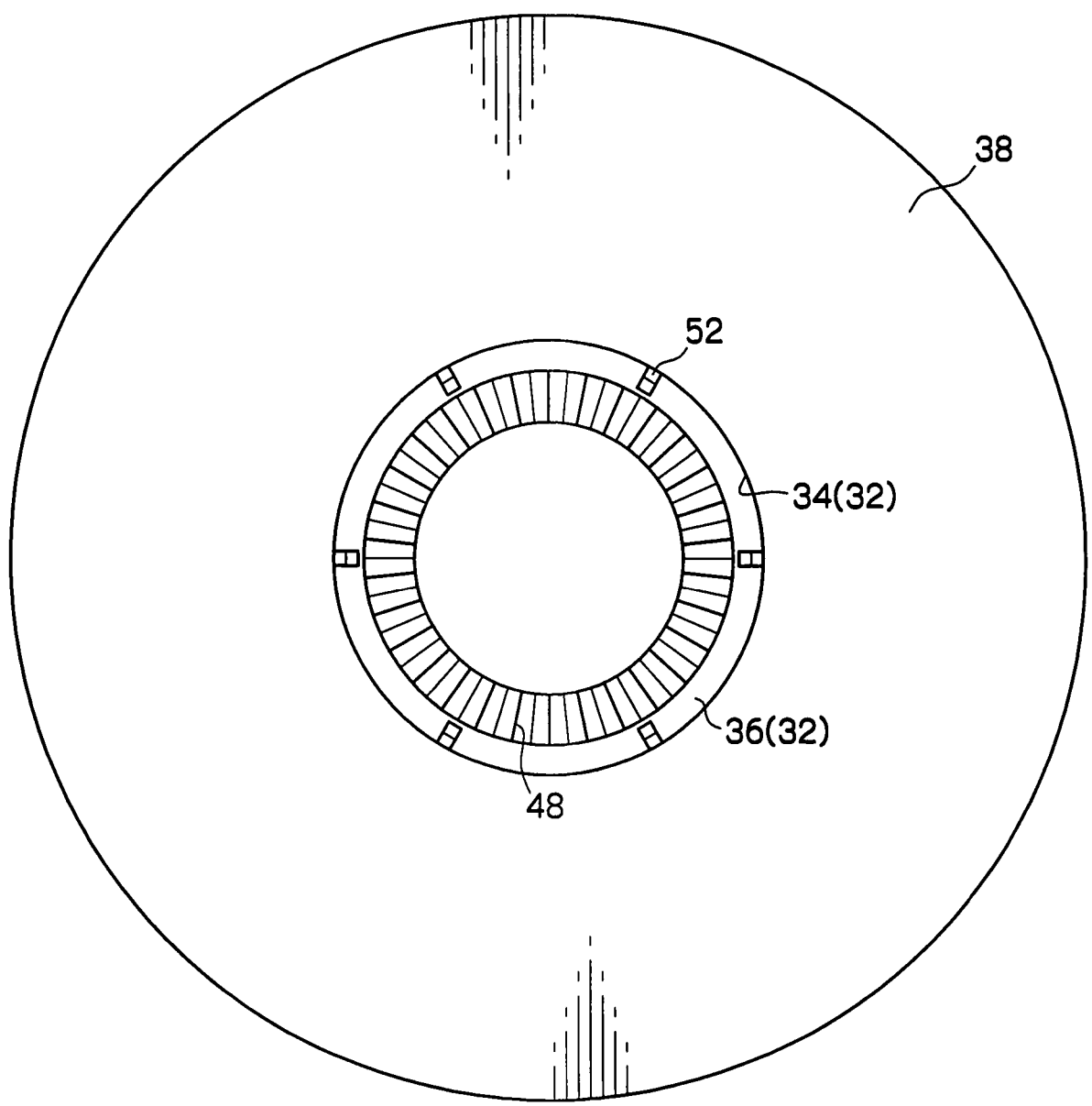
FIG. 6 is a flat drawing of the upper flange and reel hub.
Figure 7:
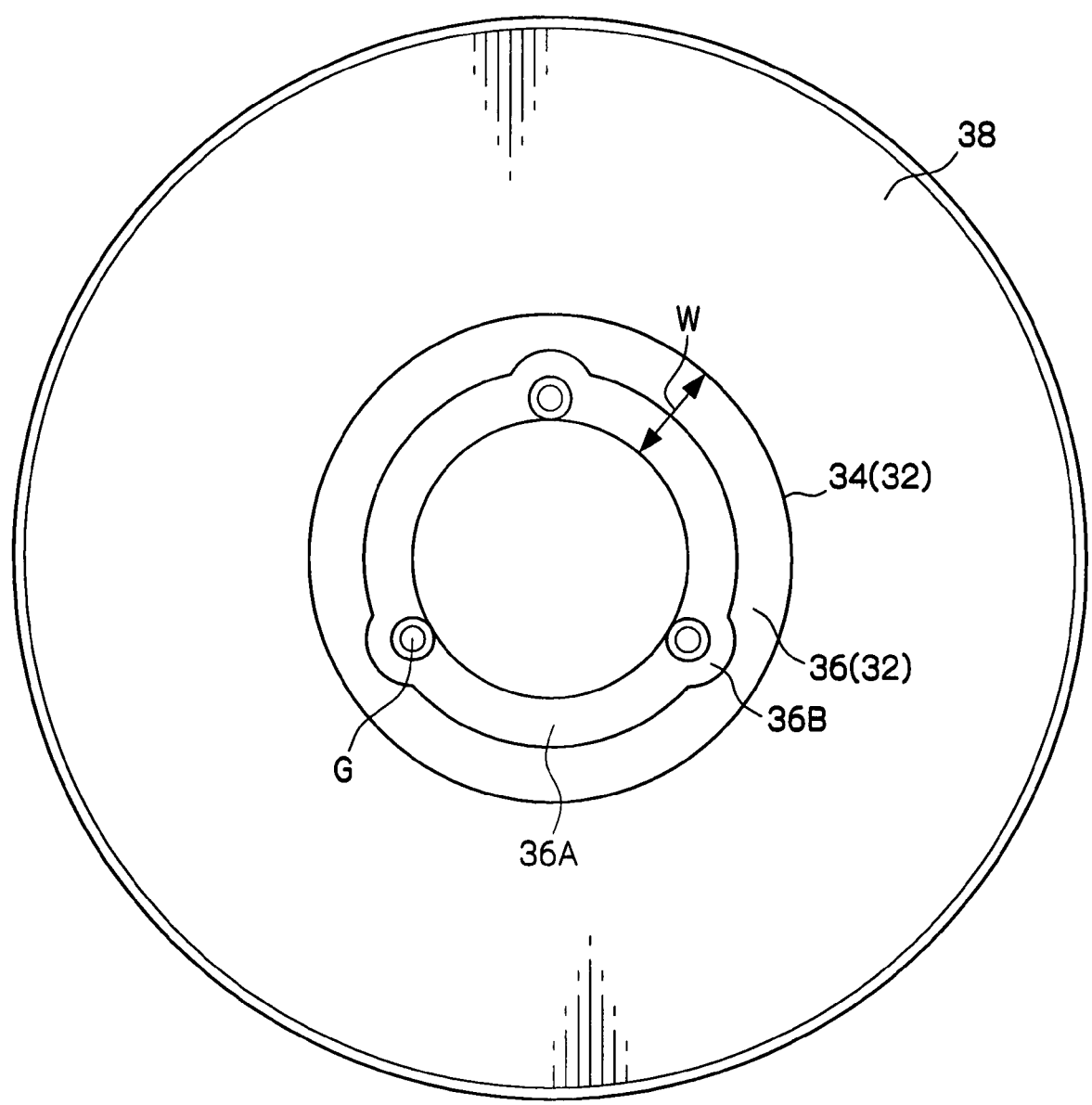
FIG. 7 is a bottom-surface drawing of the upper flange and reel hub.

Further, as shown in FIG. 6, an annular engage gear 48, coaxially formed with the reel hub 32, is formed on the upper surface of the annular extension 36 formed at the reel hub 32. The engage gear 48 is made to be able to mesh with a braking gear 66 of a brake component 60, which will be described later. Also, plural standing ribs 52 are provided (in the drawing, six) at equal intervals therebetween in the peripheral direction, at the outer side in the diameter direction of the engage gear 48. The standing ribs 52 are at the inner surface of the cylinder 34 and on the upper surface of the annular extension 36, each along the direction of the axial line of the reel 30. Due to the existence of these standing ribs 52, the engage gear 48 becomes positioned more to the inner side in the diameter direction than the reel gear 44. Note that the standing ribs 52 will be described later with the brake component 60.

Also, as shown in FIGS. 2 and 3, the reel 30 is designed to be housed in the case 12 and placed on the annular rib 22 when not in use. More specifically, the reel 30 is so that the outer side portion of the tapered portion 43 in the bottom wall 42 comes into contact with the upper end surface of the annular rib 22. The upper inner edge portion of the annular rib 22 has a tapered surface 22A that corresponds with the tapered portion 43, whereby movement in the diameter direction is restricted. Thus, this is configured so the entering of dust and the like therefrom is prevented.

In this overall state, the reel 30 is positioned inside the case 12 and the reel gear 44 and reel plate 46 are exposed from the gear opening 20 (see FIG. 1B). That is, the reel gear 44 does not protrude out from the exterior surface (i.e., undersurface) of the bottom panel 16A, rather, it is positioned outside but near of the case 12 from the gear opening 20. Also, the through-hole 50 is positioned near at the gear opening 20 through the through-hole 46A of the reel plate 46.

Due to this, operation of the reel 30 (i.e., chucking (retaining) and driving for rotation) is made possible from the exterior of the case 12. Also, in this state, an annular restricting rib 58 provided so as to stand from the top panel 14A enters into the upper portion of the cylinder 34 of the reel 30. The restricting rib 58 makes the outer peripheral surface thereof adjoin the inner peripheral surface of the cylinder 34 (the reel hub 32), so the configuration is such where rattling of the reel 30 inside the case 12 is prevented.

Also, the recording tape cartridge 10 is provided with the brake component 60 as a braking unit that blocks rotation of the reel 30 when it is not in use. The brake component 60 has a base 62, which is formed into a substantially cylindrical shape, has a bottom, and is open downward. An annularly-shaped flat panel 64 is provided to extend from the center portion in the axial line direction at the outer peripheral portion of the base 62 to the outer side in the direction of diameter across the whole periphery, and the braking gear 66 is provided across the entire periphery at the undersurface of the flat panel 64. That is, the entire braking gear 66 is annularly formed and is configured to be able to mesh with the engage gear 48 of the reel 30.

Also, a slide protrusion 68 is provided at the undersurface of the base 62 in the central axis portion. The leading end portion of the slide protrusion 68 is formed into a substantially ball-shaped surface and is made to touch at a point with the clutch component 84, which will be described later. A cross-shaped protrusion 70 is provided to stand at the upper surface of the base 62 and is formed into what appears as a substantially cross-shaped groove in the interior. Also, an annularly-shaped rib 72 is provided so as to stand at the upper surface of the base 62, and the upper surface of between the rib 72 and the cross-shaped protrusion 70 is made into a spring-receiving surface 74 that contacts one end of a compressed coil spring 76, which will be described later.

This kind of brake component 60 is movable in the up and down directions (in the axial line direction of the reel 30) in the cylinder 34 of the reel hub 32, and is provided so as be inserted coaxially. That is, the brake component 60 moves in the up and down directions, whereby it can take a position where the braking gear 66 meshes with the engage gear 48 of the reel hub 32 (a rotation lock position) and a position that releases that meshing or engagement (a position allowing rotation).

A cross-shaped rib 80 that is provided to protrude downward from the top panel 14A of the case 12 is also made so as to enter into the groove of the cross-shaped protrusion 70 of the brake component 60. The cross-shaped rib 80 is formed from two thin flat board pieces that intersect each other perpendicularly and meshes with the groove wall of the cross-shaped protrusion 70, whereby it blocks rotation relative to the case 12 of the brake component 60. Accordingly, the brake component 60 can block rotation of the reel 30 in a state where it has made the braking gear 66 mesh with the engage gear 48 of the reel hub 32.

Note that the cross-shaped rib 80 is made so that a state is maintained where it is entered into the groove across the entire movement stroke in the up and down directions of the brake component 60. It is also configured to fulfill the function of guiding the direction of movement in the up and down directions. Also, the device is configured so when the brake component 60 is positioned in the rotation-lock position, movement in the diameter direction is restricted by the standing ribs 52 of the reel 30. When positioned in the position where rotation is allowed, it does not interfere with the standing ribs 52 rotating with the reel 30.

That is, the standing ribs 52 are positioned to adjoin the outer peripheral edge of the flat panel 64 of the brake component 60 positioned in the rotation-lock position. Also, the top portion is cut away so that the intervals, which are at the outer peripheral edge of the brake component 60 positioned so that rotation is allowed, become over a preset value. Due to this, not only is movement of the reel 30 directly restricted by the case 12, in the vicinity of the position of the center of gravity, movement in the diameter direction relative to the case 12 through the brake component 60 is restricted. The reel 30 is also stabilized by the lengthwise placed drive device (i.e., with the axial line of the reel 30 as the horizontal direction) and can thus be loaded.

The compressed coil spring 76 is also is also arranged as, in a broad sense, a biasing unit that is gripped between the spring-receiving surface 74 of the brake component 60 and the top panel 14A. One end portion of the compressed coil spring 76 comes into contact with the spring-receiving surface 74 and the other end portion comes into contact with the top panel 14A. This other end portion is positioned at the inner side of the annular wall 78 provided to protrude toward the outer side of the cross-shaped rib 80 in the top panel 14A, and is made so that the positioning does not slip in the diameter direction.

The brake component 60 is biased downward due to the biasing force of this compressed coil spring 76, and is configured to make the braking gear 66 always mesh with the engage gear 48 and prevent accidental rotation of the reel 30 with certainty (i.e., to make the brake component 60 in the rotation-lock position). Also, the reel 30 that is meshing with the brake component 60 at the engage gear 48 is also biased downward due to this biasing force so that it comes into contact with the annular rib 22 and does not rattle inside the case 12.

The recording tape cartridge 10 is also provided with the clutch component 84 that acts as a release component operated from the exterior when releasing the state where the reel 30 is locked by the brake component 60. The clutch component 84 is made to be pressed upon by a releasing protrusion 110 of the drive device that will be described later and move upward with the action where the reel gear 44 meshes with the drive gear 108 of the drive device. The clutch component 84 is positioned between the bottom wall 42 of the reel 30 and the brake component 60.

That is, this clutch component 84 is shaped into a substantially columnar shape that is inserted through the through-hole 46A and the through-hole 50, and the outer diameter is slightly smaller than the through-hole 46A of the reel plate 46, i.e., the inner diameter of the through-hole 50 that is in accordance with the inner diameter of the clutch boss 54. Also, the flat upper end surface of the axial center of the clutch component 84 is a slide surface 86 that is usually in contact with the slide protrusion 68 of the brake component 60, and the flat lower end surface that opens downward around the provided hole is a press operation surface 88. Accordingly, the configuration is such that when the press operation surface 88 of the clutch component 84 is pressed upon, it resists the biasing force of the compressed coil spring 76 and moves upward, thus moving the brake component 60 into the position that allows rotation.

Also, this clutch component 84 is provided with rotation-restricting ribs 90 that project toward the outer side in the diameter direction further than the outer peripheral surface. Plural rotation-restricting ribs 90 (in the present embodiment, six) are provided at equal intervals in the peripheral direction of the clutch component 84 and each rotation-restricting rib 90 is arranged so that, when viewed as a flat surface, they appear in a radial pattern. Each rotation-restricting rib 90 protrudes upward higher than the slide surface 86 so as to span the upper end surface around the slide surface 86 of the clutch component 84 and the outer peripheral surface in the vicinity of that upper end surface (i.e., is linked respectively thereto).

Each of the rotation-restricting ribs 90 is also made to enter respectively into rotation-restricting grooves 82 provided concavely (see FIGS. 4, 8, 10 and 11) at the inner edge portion of the clutch boss 54. That is, there are six rotation-restricting grooves 82 each provided at even intervals in the peripheral direction of the clutch boss 54 and these open upward at the upper edge of the clutch boss 54. Due to this, the clutch component 84 is guided at the rotation-restricting ribs 90 by the rotation-restricting grooves 82 of the clutch boss 54 while movement in the up and down directions remains possible.

Further, each of the rotation-restricting ribs 90 are made so that the state where they have entered into the rotation-restricting grooves 82 of the clutch boss 54 is maintained even when the clutch component 84 moves upward and positions the brake component 60 in the position that allows rotation. Due to this, the clutch component 84 is configured so that relative rotation to the reel 30 is impossible, i.e., to always rotate integrally with the reel 30. Further, each rotation-restricting groove 82 is sealed at the bottom end portion of the clutch boss 54 so due to the rotation-restricting ribs 90 and the rotation-restricting grooves 82, dropping out of the clutch component 84 from the reel hub 32 is prevented.

Note that as shown in FIGS. 2 and 3, the rotation shaft 100 of the drive device is provided with a rotation axis 102, and a circular rotation table 104 is provided integrally to extend from the upper end of the rotation axis 102. The drive gear 108 is annularly formed on the upper surface of the rotation table 104 and at the outer peripheral edge portion so as to be able to engage with the reel gear 44 of the recording tape cartridge 10. Also, a substantially circularly-formed magnet 106 is coaxially arranged on the upper surface of the rotation table 104 at the inner side in the diameter direction of the drive gear 108. The releasing protrusion 110 that is in contact with the press operation surface 88 of the clutch component 84 is formed at the axial center portion of the rotation table 104.

Next, the operation of the recording tape cartridge 10 provided with the reel 30 configured as described above will be explained. When the recording tape cartridge 10 is not in use, the brake component 60 is positioned in the rotation-lock position due to the biasing force of the compressed coil spring 76 and the braking gear 66 is made to engage with the engage gear 48. For this reason, rotation of the reel 30 relative to the case 12 is blocked. At this time, the reel gear 44 of the reel 30 is exposed from the gear opening 20 and the clutch component 84 is inserted through the through-hole 50 and through-hole 46A and is positioned near at the gear opening 20.

When using the recording tape T, the recording tape cartridge 10 is loaded to the bucket (not shown) of the drive device along the direction of the A arrow. Then when the recording tape cartridge 10 has been loaded to the bucket up to a preset depth, the bucket moves downward and the rotation shaft 100 of the drive device approaches relatively (i.e., moves upward) toward the gear opening 20 of the case 12 and retains the reel 30. More specifically, the rotation shaft 100 adsorbs and retains the reel plate 46 by the magnet 106 without contacting it and makes the drive gear 108 mesh with the reel gear 44.

In accompanying of the meshing of this reel gear 44 and drive gear 108, that is, relative movement toward the side approaching in the axial direction of the rotation shaft 100 with respect to the case 12, the releasing protrusion 110 of the rotation shaft 100 comes into contact with the press operation surface 88 of the clutch component 84, and resisting the biasing force of the compressed coil spring 76, pressing the clutch component 84 upward. Due to this, the brake component 60 that is in contact with the clutch component 84 also moves upward at the slide protrusion 68, and the meshing between the braking gear 66 of the brake component 60 and the engage gear 48 is released.

That is, the brake component 60 is made to move to a position that allows rotation relative to the reel 30. After that, when the rotation shaft 100 moves relatively even further upward, resisting the biasing force of the compressed coil spring 76, and the reel 30 is lifted upward with the clutch component 84 and brake component 60 (as is, without changing relative positioning). The brake component 60 reaches the position that allows rotation (relative to the case 12) and the lower flange 40 takes distance from the annular rib 22 (tapered surface 22A). Due to this, the reel 30 rises (floats) inside the case 12 and becomes rotatable in a state of non-contact with the inner surface of the case 12.

Also, at this time, due to the bucket, i.e., recording tape cartridge 10 moving downward inside the drive device, positioning pins of the drive device enter into each of the positioning holes 24, 26 of the case 12 of the case 12, and each of the reference surfaces 24A, 26A of the case 12 comes into contact with the reference surface of the drive device. Due to this, the recording tape cartridge 10 is positioned in the horizontal and vertical directions relative to the drive device. When this occurs, a pullout unit of the drive device engages with the hooking depression 28A of the leader block 28, extracts the leader block 28 from the case 12, and leads it to the windup reel of the drive device.

Then the leader block 28 is fitted into the reel hub of the windup reel and the arced surface 28B forms one portion of the windup surface that winds or takes up the recording tape T. In this state, when the leader block 28 rotates integrally with the windup reel, the recording tape T is wound up to the reel hub of the windup reel and is pulled out from the case 12 through the opening 18. Note that at this time, the reel 30 of the recording tape cartridge 10 rotates in synchronization with the windup reel due to the rotation force of the rotation shaft 100 which force is transmitted by the drive gear 108 which is engaged with the reel gear 44.

Then the recording of data to the recording tape T or the playback of data recorded on the recording tape T is performed with a recording/playback head (not shown) arranged along a preset tape path of the drive device. Note that at this time, the slide protrusion 68 of the brake component 60 that cannot rotate relative to the case 12 slide-contacts against the slide surface 86 of the clutch component 84 that rotates, relative to the case 12, together with the reel 30. That is, the configuration is such where the clutch component 84, in a state where the reel gear 44 is meshing or engaged with the drive gear 108, maintains the state of contact with the releasing protrusion 110 at the press operation surface 88 and the brake component 60 is retained in the position that allows rotation.

Then when the reel 30 rotates, there is no relative rotation between the clutch component 84 that rotates integrally with the reel 30 and the rotation shaft 100 that drives the reel 30, and is configured so the press operation surface 88 and the releasing protrusion 110 do not slide-contact against each other. It is configured so that the slide surface 86 of the clutch component 84 and the slide protrusion 68 of the brake component 60 (which cannot rotate relative to the case 12) slide-contact against each other. In this manner, there is no relative rotation between the rotation axis 102 and the clutch component 84, so there are no problems such as wearing of the releasing protrusion 110 and/or the press operation surface 88.

Meanwhile, when the recording of data to the recording tape T or the playing back of data recorded on the recording tape T is finished, the recording tape T is rewound to the reel 30 and the leader block 28 is retained in the vicinity of the opening 18 of the case 12. Then the bucket into which the recording tape cartridge 10 is loaded rises. When this occurs, the engaging between the reel gear 44 and the drive gear 108 is released, and contact between the releasing protrusion 110 and the press operation surface 88 of the clutch component 84 is released. The clutch component 84 moves downward with the brake component 60 (while maintained in a state of contact) due to the biasing force of the compressed coil spring 76.

Due to this, the braking gear 66 of the brake component 60 meshes with the engage gear 48 and the brake component 60 returns to the rotation-lock position that blocks rotation of the reel 30 relative to the case 12. Also, the reel 30 also moves downward with the action of movement of the brake component 60 and clutch component 84 due to the biasing force of the compressed coil spring 76. The lower flange 40 is made to contact the annular rib 22 while the reel gear 44 is reverted to the beginning state where the reel gear 44 is exposed from the gear opening 20. In this state, the recording tape cartridge 10 is ejected from the drive device (bucket).

Here, the upper flange 38 and the reel hub 32 are integrally formed. The reel 30 is made by welding the lower flange 40 that has the bottom wall 42 to the reel hub 32 integrally formed with the upper flange 38. Then the reel plate 46 is fixed to the bottom wall 42 in advance with insert molding. That is, when the lower flange 40 is welded to the reel hub 32, the reel plate 46 is already in a state where it is fixed to the bottom wall 42. Accordingly, this has merits such as the number of processes and manufacturing costs can be reduced, as opposed to conventional processes where the reel plate 46 is attached after welding the lower flange 40 to the reel hub 32.

Further, since the upper flange 38 and reel hub 32 are integrally formed, in the metal mold, the position of the gate through which the resin material flows can be provided at a position corresponding to the annular extension 36 of the reel hub 32 (expanded depressions 36B). That is, if the gate G is formed in such a position, the resin material flows into a side of the metal mold corresponding to the reel hub 32 and fills while flowing into a side of the metal mold corresponding to the upper flange 38 so there are no problems such as such as in conventional technologies like reverse flow of the resin material at the portion where the reel hub 32 is formed, and pressure is evenly distributed from the reel hub 32 to the upper flange 38. Accordingly, pressure loss during formation with a metal mold can be decreased, the strength of the upper flange 38 and the reel hub 32 can be improved, and the surface runout on the upper flange 38 relative to the reel hub 32 can be decreased.

Further, the gates G are formed on the reel gear 44 as well as the lower flange 40 so, unlike conventionally, there are no problems such as reverse flow of the resin material, and pressure is evenly distributed from the bottom wall 42 to the lower flange 40. Accordingly, pressure loss during formation with the metal mold can be decreased and the strength of the lower flange 40 can be improved. Then, since this lower flange 40 is welded to the reel hub 32, the surface runout of the lower flange 40 relative to the reel hub 32 can also be decreased. That is, due to this type of configuration, the surface runouts of the upper flange 38 and the lower flange 40 can be suppressed. Also, the occurrence of problems such as the upper flange 38 and lower flange 40 deforming, caused by the tight winding that occurs when the recording tape T is wound to the reel hub 32, and touching the recording tape T thereto can be prevented.

Further, when welding the lower flange 40 to the reel hub 32, the annular stage 42A and expanded protrusions 42B formed on the bottom wall 42 of the lower flange 40 are fit together with the annular depression 36A and expanded depressions 36B formed on the annular extension 36 of the reel hub 32, so positioning of the reel hub 32 relative to the reel gear 44 formed on the bottom wall 42 of the lower flange 40 can be performed. That is, the degree to which the reel gear 44 and the reel hub 32 are in a coaxial state can be secured at the optimum level. Also, plural depressions 40A of preset depth are formed on the upper surface of the lower flange 40 so air between the recording tape T when it is wound to the reel hub 32 can be expelled from those depressions 40A. Due to this, the winding form of the recording tape T to the reel 30 (reel hub 32) can be made neat.

Note that in the recording tape cartridge 10 of the above-described embodiment, the configuration is such where there is the leader block 28 that acts as the leader component, however, the recording tape cartridge 10 is not limited to the above-described embodiment. For example, the configuration can be made so that a cylindrical leader pin (not shown) acts as the leader component. Also, the configuration can be made to have a shielding component that opens and closes the opening 18 (e.g., a slide door (not shown) that moves along a preset straight line or arc). Furthermore, it is sufficient if the recording tape T can be a member that is recognized, acts as a long tape-shaped data recording/playback medium with which the recording of data and playback of recorded data is possible. It is also a given that the recording tape cartridge 10 (reel 30) can also be applied to the recording tapes T of any types of recording/playback systems.

What is claimed is:

1. A reel comprising:
   a cylindrical hub onto which a recording tape is wound;
   an upper flange that is integrally provided at the hub, and that extends from one end portion of the hub; and
   a lower flange that includes a bottom wall to which a reel plate is fixed, and that is welded to the other end portion of the hub.

2. The reel of claim 1, wherein an engage portion is formed at the lower flange, and a portion that is engaged with the engage portion is formed at the other end portion of the hub.

3. The reel of claim 2, wherein the engage portion is formed at an upper surface of the lower flange as a convex portion, and the portion that is engaged with the engage portion is formed at the other end portion of the hub as a concave portion.

4. The reel of claim 1, wherein the hub and the upper flange are integrally formed from a resin material with a metal mold, and a gate mark that corresponds to an injection port of the metal mold for injecting the resin material is formed at the other end portion of the hub.

5. The reel of claim 1, wherein a plurality of depressions are formed in the lower flange.

6. The reel of claim 5, wherein the plurality of depressions are formed with substantially constant intervals therebetween at an upper surface of the lower flange.

7. The reel of claim 1, wherein the hub and the upper flange are integrally formed from a resin material with a metal mold, and an injection port for injecting the resin material is provided at the metal mold at a position corresponding to the other end portion of the hub.

8. The reel of claim 1, wherein the reel plate is fixed to the bottom plate by insert molding.

9. A reel comprising:

a cylindrical hub onto which a recording tape is wound;

an upper flange that is integrally provided at the hub, and that extends from one end portion of the hub; and a lower flange that includes a bottom wall to which a reel plate is fixed, and that is welded to the other end portion of the hub, wherein the hub and the upper flange are integrally formed from a resin material with a metal mold, and a gate mark that corresponds to an injection port of the metal mold for injecting the resin material is formed at the other end portion of the hub.

* * * * *